(12) United States Patent
Hajash et al.

(10) Patent No.: US 11,833,691 B2
(45) Date of Patent: Dec. 5, 2023

(54) HYBRID ROBOTIC MOTION PLANNING SYSTEM USING MACHINE LEARNING AND PARAMETRIC TRAJECTORIES

(71) Applicant: Samsung Electronics Company, Ltd., Suwon si (KR)

(72) Inventors: Kathleen Sofia Hajash, San Francisco, CA (US); Brian Harms, San Jose, CA (US); Philipp Schoessler, Scotts Valley, CA (US); Dane Mason, San Francisco, CA (US)

(73) Assignee: Samsung Electronics Co., Ltd., Suwon si (KR)

( * ) Notice: Subject to any disclaimer, the term of this patent is extended or adjusted under 35 U.S.C. 154(b) by 240 days.

(21) Appl. No.: 17/217,806

(22) Filed: Mar. 30, 2021

(65) Prior Publication Data
US 2022/0314444 A1 Oct. 6, 2022

(51) Int. Cl.
*B25J 9/16* (2006.01)
*B25J 13/08* (2006.01)

(52) U.S. Cl.
CPC ............. *B25J 9/1664* (2013.01); *B25J 9/163* (2013.01); *B25J 9/1607* (2013.01); *B25J 9/1661* (2013.01); *B25J 13/088* (2013.01)

(58) Field of Classification Search
CPC ........ B25J 9/1664; B25J 9/1607; B25J 9/163; B25J 9/1661; B25J 13/088
See application file for complete search history.

(56) References Cited

U.S. PATENT DOCUMENTS

| | | | |
|---|---|---|---|
| 7,751,938 B2 | 7/2010 | Tsusaka | |
| 8,452,451 B1 | 5/2013 | Francis, Jr. | |
| 8,855,814 B2 | 10/2014 | Kim | |
| 8,972,057 B1 | 3/2015 | Freeman | |
| 2010/0204828 A1 | 8/2010 | Yoshizawa | |
| 2010/0231506 A1 | 9/2010 | Pryor | |
| 2011/0208355 A1 | 8/2011 | Tsusaka | |
| 2012/0156362 A1 | 6/2012 | Sadovoy et al. | |
| 2016/0167228 A1 | 6/2016 | Wellman | |
| 2018/0029226 A1 | 2/2018 | Dani | |
| 2018/0290302 A1 | 10/2018 | Wang et al. | |

(Continued)

FOREIGN PATENT DOCUMENTS

| DE | 102006055917 | 6/2008 |
|---|---|---|
| EP | 3578322 | 11/2019 |

(Continued)

OTHER PUBLICATIONS

PCT Search Report in PCT/KR2022/003240, dated Jun. 22, 2016.

(Continued)

*Primary Examiner* — Jonathan L Sample
*Assistant Examiner* — Matthew C Gammon

(57) ABSTRACT

In one embodiment, a method includes accessing a trajectory plan for a task to be executed by a robotic system, determining actions to constrain the trajectory plan based on information associated with an environment associated with the robotic system, wherein pose-based waypoints and joint positions of the robotic system would be constrained by the actions, determining joint-based waypoints for the trajectory plan based on the pose-based waypoints, and executing the task based on the joint-based waypoints for the trajectory plan.

20 Claims, 12 Drawing Sheets

(56) References Cited

U.S. PATENT DOCUMENTS

| | | | |
|---|---|---|---|
| 2019/0084158 A1 | 3/2019 | Atherton | |
| 2019/0143512 A1 | 5/2019 | Corkum | |
| 2019/0143517 A1 | 5/2019 | Yang | |
| 2019/0366543 A1* | 12/2019 | Butterfoss | B25J 9/1643 |
| 2019/0381654 A1 | 12/2019 | Oleynik | |
| 2020/0001463 A1 | 1/2020 | Kim | |
| 2020/0086487 A1 | 3/2020 | Johnson | |
| 2020/0130192 A1 | 4/2020 | Ogawa | |
| 2021/0069910 A1 | 3/2021 | Oleynik | |
| 2021/0197378 A1* | 7/2021 | Schönherr | B25J 9/1666 |
| 2021/0276188 A1* | 9/2021 | Tang | G06N 3/08 |
| 2021/0284198 A1 | 9/2021 | Schmidt | |
| 2021/0308865 A1 | 10/2021 | Lin | |
| 2021/0309264 A1 | 10/2021 | Felip Leon | |
| 2021/0387350 A1 | 12/2021 | Oleynik | |
| 2022/0032461 A1* | 2/2022 | Gupta | B25J 9/1664 |
| 2022/0250240 A1* | 8/2022 | Gaydarov | B25J 9/0045 |
| 2022/0371195 A1 | 11/2022 | Lee | |

FOREIGN PATENT DOCUMENTS

| | | |
|---|---|---|
| EP | 3684559 | 7/2020 |
| JP | 2018-158393 A | 10/2018 |
| JP | 2019-123022 A | 7/2019 |
| JP | 6060841 | 8/2019 |
| JP | 2020082217 | 6/2020 |
| JP | 2020097091 | 6/2020 |
| KR | 2011-0015833 A | 2/2011 |
| KR | 20160124770 | 10/2016 |
| KR | 2018-0114698 | 10/2018 |
| WO | WO 2020-017092 | 1/1920 |
| WO | WO 2019/029870 | 2/2019 |
| WO | WO 2019/053474 | 3/2019 |
| WO | WO 2020-075526 A1 | 4/2020 |

OTHER PUBLICATIONS

PCT Written Decision in PCT/KR2022/003240, dated Jun. 22, 2016.
Choreograph programming interface by Automata https://automata.tech/programming-eva-choreograph-and-the-api/, Downloaded from web Jan. 25, 2021.
PCT Search Report in PCT/KR2022/000950, dated May 22, 2010.
PCT Written Decision in PCT/KR2022/000950, dated May 22, 2010.
PCT Search Report in PCT/KR2022/004300, dated Jul. 8, 2022.
PCT Written Opinion in PCT/KR2022/004300, dated Jul. 8, 2022.
Non-final office action in U.S. Appl. No. 17/198,128, dated Jan. 20, 2023.
Non-final office action in U.S. Appl. No. 17/198,152, dated Jan. 18, 2023.
Final office action in U.S. Appl. No. 17/198,152, dated Apr. 21, 2023.
Final office action in U.S. Appl. No. 17/198,128, dated May 10, 2023.
Non-final office action in U.S. Appl. No. 17/198,152, dated Jul. 21, 2023.
Notice of Allowance in U.S. Appl. No. 17/198,128, dated Jul. 17, 2023.
Final office action in U.S. Appl. No. 17/198,152 dated Aug. 22, 2023.
Non-final office action in U.S. Appl. No. 17/198,152, dated Oct. 23, 2023.

* cited by examiner

HYBRID ROBOTIC MOTION PLANNING SYSTEM USING MACHINE LEARNING AND PARAMETRIC TRAJECTORIES

TECHNICAL FIELD

This disclosure relates generally to robotics, and in particular relates to machine-learning for robotics.

BACKGROUND

A robot is a machine, especially one programmable by a computer, capable of carrying out a complex series of actions automatically. Robots may be guided by an external control device or the control may be embedded within. Robots may be constructed on the lines of human form, but most robots are machines designed to perform a task with no regard to their aesthetics. Robots may be autonomous or semi-autonomous and range from humanoids to industrial robots, medical operating robots, patient assist robots, dog therapy robots, collectively programmed swarm robots, UAV drones, and even microscopic nano robots. By mimicking a lifelike appearance or automating movements, a robot may convey a sense of intelligence or thought of its own. Autonomous things may be expected to proliferate in the coming decade, with home robotics and the autonomous car as some of the main drivers.

The branch of technology that deals with the design, construction, operation, and application of robots, as well as computer systems for their control, sensory feedback, and information processing is robotics. These technologies deal with automated machines that can take the place of humans in dangerous environments or manufacturing processes, or resemble humans in appearance, behavior, or cognition. Many of today's robots are inspired by nature contributing to the field of bio-inspired robotics. Robots have replaced humans in performing repetitive and dangerous tasks which humans prefer not to do, or are unable to do because of size limitations, or which take place in extreme environments such as outer space or the bottom of the sea.

DESCRIPTION OF EXAMPLE EMBODIMENTS

Robotic System

This disclosure describes systems and methods that combine lightweight and low-cost components with captured sensor data from one or more sensors, such as image sensors, to increase the accuracy and precision of the robotic system through software. Image sensors are often affordable relative to robotic limb components and can be accurate for measuring distances and poses of objects within their respective fields of view.

Figure 1:
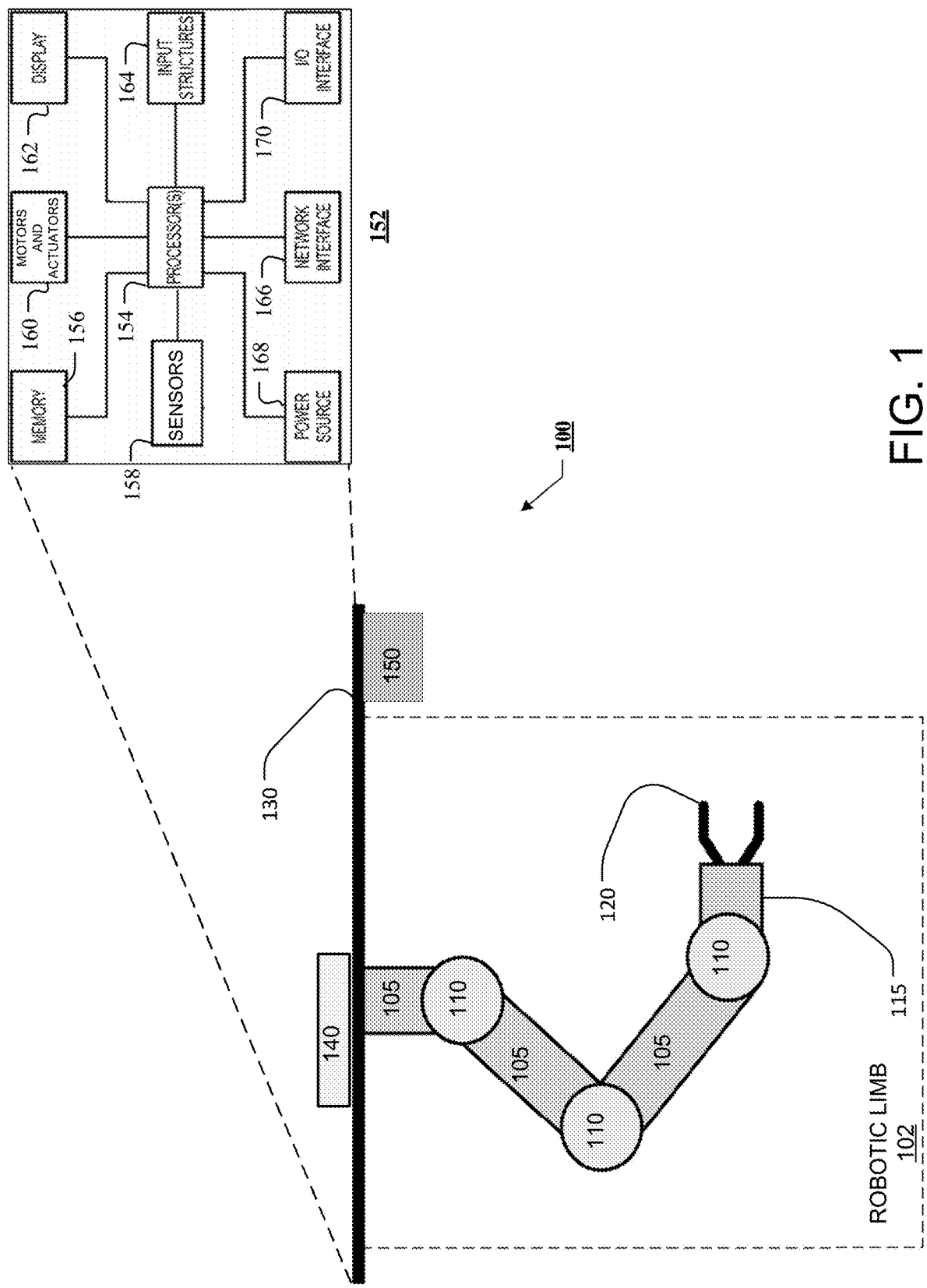
FIG. 1 illustrates an example robotic system chosen below.

FIG. 1 illustrates an example robotic system chosen below. In particular embodiments, a robotic system 100 may include a robotic limb that may perform operations to provide services to one or more users in different tasks such as cooking, gardening, painting, etc. Robotic limb 102 may include any suitable combination of one or more limb segment 105, joint 110, and end-effector 115. In some embodiments, robotic limb 102 may further include one or more manipulators. As an example and not by way of limitation, this manipulator may include one or more fingers 120, a suction-based gripper, or a jammable-based gripper. In some embodiments, robotic limb 102 may be connected at one end to a fixed surface 130 via mounting base 140, which may be a low-profile mounting base. In some embodiments, robotic limb 100 may be associated with one or more external sensors 150. As an example and not by way of limitation, this fixed surface may include a wall, a ceiling, a cabinet, a workbench, etc. As further depicted by FIG. 1, the robotic system 100 may include an onboard computing system 152 that may be utilized for the operation of the robotic limb 102, in accordance with the presently disclosed embodiments. The onboard computing system may track multiple components of a robotic limb, such as joints, end-effectors, grippers, fingers, etc., and adjusts their pose accordingly until a desired pose is reached. A pose may include either of, or both of, the position in three-dimensional (3D) space and the orientation of the one or more components of the robotic limb.

For example, in some embodiments, the onboard computing system 152 may include, among other things, one or more processor(s) 154, memory 156, sensors 158, one or more motors and actuators 160, a display 162, input structures 164, network interfaces 166, a power source 168, and an input/output (I/O) interface 170. It should be noted that FIG. 1 is merely one example of a particular implementation and is intended to illustrate the types of components that may be present in the robotic system 100. As depicted, the one or more processor(s) 154 may be operably coupled with the memory 156 to perform various algorithms for instructing the robotic limb 102 to perform different operations. Such programs or instructions executed by the processor(s) 154 may be stored in any suitable article of manufacture that includes one or more tangible, computer-readable media at least collectively storing the instructions or routines, such as the memory 156. The memory 156 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor (s) 154 to enable the robotic limb 102 to perform various functionalities.

In certain embodiments, the sensors 158 may include, for example, one or more cameras (e.g., depth cameras), touch sensors, microphones, motion detection sensors, thermal detection sensors, light detection sensors, time of flight (ToF) sensors (e.g., LiDAR system), ultrasonic sensors, infrared sensors, or other similar sensors that may be utilized to detect various user inputs (e.g., user voice inputs, user gesture inputs, user touch inputs, user instrument inputs, user motion inputs, and so forth). The motors and actuators 160 may include any number of electronic motors (e.g., DC motors) that may be utilized to drive actuators, which may allow the robotic limb 102 to perform various mechanical operations and/or motional operations (e.g., walking, head and neck motions, limb and joint motions, body motions, dance motions, eye motions, and so forth). The display 162 may include any display architecture (e.g., LCD, OLED, e-Ink, projection, augmented reality glasses, and so forth), which may provide further means by which users may interact and engage with the robotic limb 102.

In certain embodiments, the input structures 164 may include any physical structures utilized to control one or more global functions of the robotic limb 102 (e.g., pressing a button to power "ON" or power "OFF" the robotic limb 102). The network interface 166 may include, for example, any number of network interfaces suitable for allowing the robotic limb 102 to access and receive data over one or more cloud-based networks (e.g., a cloud-based service that may service hundreds or thousands of the robotic limb 102 and the associated users corresponding thereto) and/or distributed networks. The power source 168 may include any suitable source of power, such as a rechargeable lithium polymer (Li-poly) battery and/or an alternating current (AC) power converter that may be utilized to power and/or charge the robotic limb 102 for operation. Similarly, the I/O interface 170 may be provided to allow the robotic limb 102 to interface with various other electronic or computing devices, such as one or more auxiliary electronic devices.

In particular embodiments, the onboard computing system 152 may instruct the robotic limb 102 to achieve a desired pose. The onboard computing system 152 may access sensor data representing a scene from one or more sensors. These sensors may comprise for example and not by way of limitation, one or more three-dimensional (3D) cameras, LIDAR, DVS, or RGB-D cameras. In particular embodiments, the sensor data may comprise image data (such as RGB-D or depth images). In particular embodiments, non-image based data (such as RFID data) may be used instead of, or in conjunction with, the image data. The sensor data may represent a scene that includes a least a portion of the robotic limb 102 that can thus be utilized by the computing device for various functions related to pose of the robotic limb 102. This disclosure contemplates that the one or more sensors can be located on the robotic limb 102 or external to the robotic limb 102, or both. Other sensors for sensing the pose of the robotic limb 102 may be built into the robotic system 100 of which the limb 102 is a part, and may include joint encoders, computation encoders, limit switches, motor current sensors, or any suitable combination thereof.

In particular embodiments, the onboard computing system 152 may isolate at least a portion of the sensor data that represents at least a portion of the robotic limb 102. As an example and not by way of limitation, this may be completed through a point cloud technique. In particular embodiments, the onboard computing system 152 may use 3D depth sensor data to record one or more snapshots of the point cloud of positional data points of the scene. These data points may include information about one or more external surfaces contained in the scene, including the external surfaces of the robotic limb 102, the table surface, and one or more objects contained in the scene. From this, the onboard computing system 152 may isolate a two-dimensional (2D) region that contains at least a portion of one or more objects contained within the scene. From at least a portion of the sensor data, the onboard computing system 152 may create one or more RGB-D clusters of various objects in the scene. In particular embodiments, the one or more RGB-D clusters of various objects includes the robotic limb 102 contained within the scene.

In particular embodiments, the scene may contain one or more objects that are further isolated by the onboard computing system 152. Upon isolating the one or more objects in the scene, the onboard computing system 152 may classify the one or more RGB-D clusters of various objects in the scene created from the portion of the sensor data. This classification may be conducted by the onboard computing system 152 via any method of classification, including for example and not by way of limitation manual identification by a user or any method of artificial intelligence, including computer vision, machine learning, neural networks, or deep learning. Variations of neural networks utilized for classification may include, for example and not by way of limitation, three-dimensional segmentation networks (3DSNs) such as three-dimensional convolutional neural networks (3DCNNs), Deep Kd-networks, regional convolutional neural networks (RCNNs), or recurrent neural networks (RNNs). In particular embodiments, this classification may determine that at least one of the one or more objects within a scene is a robotic limb 102. In particular embodiments, the onboard computing system 152 may additionally classify other objects contained within a scene, including for example but not by way of limitation, a coffee mug, a bottle, a vase, a spoon, a plate, a screwdriver, a light bulb, a hand or arm, etc.

While the present embodiments may be discussed below primarily with respect to a robotic limb, it should be appreciated that the present techniques may be applied to any of various robotic devices that may perform various operations to provide services to users. In particular embodiments, the robotic device may comprise any electronic device or computing device that may be configured with computer-based intelligence (e.g., machine learning [ML], artificial intelligence [AI], deep learning, cognitive computing, artificial neural networks [ANN], and so forth), which may be utilized by the robotic device to perform operations to provide services to users through, for example, motions, actions, gestures, body movements, facial expressions, limb and joint motions, display changes, lighting, sounds, and so forth. For example, in one embodiment, a robotic device may include a robot, a robotic limb, or similar AI or cognitive computing device that may be provided to contextually interact, instruct, operate, and engage with (e.g., in real-time or near real-time), for example, humans, pets, other robotic electronic devices, one or more servers, one or more cloud-based services, home appliances, electronic devices, automobiles, and so forth. Furthermore, as used herein, a robotic device may refer to any autonomous or semi-autonomous computing device capable of performing one or more mechanical and/or electromechanical motions or movements (e.g., human-like motions and movements) in response to, for example, one or more user inputs, one or more user commands (e.g., voice commands, gesture commands), one or more triggers (e.g., a time trigger, a keyword trigger, a tonal trigger, a user emotional response trigger, user motional trigger, a location trigger, an environmental trigger), and so forth.

Hybrid Robotic Motion Planning System

In particular embodiments, a robotic system 100 may plan robotic motions using a hybrid architecture that leverages machine learning (ML) alongside under-constrained, parametric trajectories to deliver efficient solutions for robotic tasks. The robotic system 100 architecture may use machine learning to constrain a parametric trajectory before sending the trajectory to an inverse kinematic (IK) solver and/or to directly constrain the search space for the IK solver. Both approaches may result in a simplified problem for the IK solver. The robotic system 100 may combine machine learning or reinforcement learning (RL) with a task-based parametric trajectory to make the trajectory more robust in dynamic and unseen environments by learning to select optimal parameters (i.e. actions) to constrain the trajectory. Furthermore, the robotic system 100 may use a custom reward/loss function for a RL/ML model to not only learn how to complete the task but also to solve for natural looking trajectories. The robotic system 100 may be used wherever robots may be used to perform flexible tasks. As an example and not by way of limitation, the robotic system 100 may be used in commonplace tasks around the house such as helping in cooking tasks like stirring a pot, making coffee or chopping vegetables. As another example and not by way of limitation, the robotic system 100 may be used in places including, but are not limited to, kitchen, office, workshop, small business, machine shop, assembly lines with repetitive but sometimes changing tasks. As yet another example and not by way of limitation, the robotic system 100 may be used in other tasks such as icing a cake, taking videos or photo documentation of varied objects, tightening in bolts, spray painting many different objects, organizing a table of mixed objects such as screws, etc. Although this disclosure describes planning particular motions by particular systems in a particular manner, this disclosure contemplates planning any suitable motion by any suitable system in any suitable manner.

Programming a robot to do useful tasks may be arduous and inflexible. In industrial settings, companies may hire experts to program robots to do repetitive tasks such as spray painting an object or operating a coffee machine in a kitchen. The experts may define hardcoded trajectories (i.e., paths) that contain a series of waypoints, often defined as pose (position and orientation) or joint positions. If anything changes in the environment (e.g., tool size, objects in the robot's sphere of work, etc.), the robotics expert may need to reprogram everything. In other words, hard-coded solutions may be not adaptable to changes in the environment and may be more suitable to repetitive assembly line tasks. This approach may be impractical for robots to be used in a wider range of tasks. Another approach may be to define specific rules for certain subtasks of a complex task (e.g., pickup, grasp, scrape, etc. of stirring) and higher-level controllers for choosing between them. This approach may be slow to plan and result in strange and surprising movement especially with higher DOF robotic arms. The third approach may be based on ML/RL solutions which can sometimes learn to complete complex tasks. However, these solutions may be not robust or reliable enough to be used in practice. In order for robots to be adopted in both business-to-business (B2B) and business-to-consumer (B2C) settings (e.g., in the home or office), there may need to be a method of defining robot tasks that can be flexible, fast to compute, and reliable. For users who want to bring robots into their home, the robots may need to also move in ways that are predictable and understandable to people interacting with them.

Certain technical challenges exist for effective and efficient planning of robotic motions. One technical challenge may include rigidity of hard-coded trajectories. The solution presented by the embodiments disclosed herein to address this challenge may be using machine learning by training a machine-learning model in thousands of diverse simulated environments so that when it is deployed it may be robust enough to make decisions in unseen environments. Another technical challenge may include reliability of using machine learning alone for robot motion planning. The solutions presented by the embodiments disclosed herein to address this challenge may be using task-based parametric trajectories. By starting with an under-constrained parametric trajectory and taking input from the machine-learning model to optimize and fully constrain the trajectory to a sequence of pose-based waypoints, the system may prevent the failure or unexpected motions caused by the machine-learning model defining the entire trajectory. Another technical challenge may include efficiency of robot motion planning. The solution presented by the embodiments disclosed herein to address this challenge may be combining machine learning and a parametric trajectory as the parametric trajectory may provide a baseline trajectory that only needs a few extra parameters to customize it to a specific setting.

Certain embodiments disclosed herein may provide one or more technical advantages. A technical advantage of the embodiments may include being flexible and able to adapt to many different settings since the robotic system 100 may use observations from the environment, user preferences, and actions or constraints from the machine-learning model to customize a parametric trajectory to a variety of new settings. Another technical advantage of the embodiments may include being able to quickly and efficiently generate new trajectories since the robotic system 100 may use predefined, parametric trajectories and a trained machine-learning model. Another technical advantage of the embodiments may include being reliable as the robotic system 100 may use a parametric trajectory as a baseline to ensure successful completion of tasks and use machine learning to optimize the trajectory. Certain embodiments disclosed herein may provide none, some, or all of the above technical advantages. One or more other technical advantages may be readily apparent to one skilled in the art in view of the figures, descriptions, and claims of the present disclosure.

In particular embodiments, the robotic system 100 may access, for a task to be executed by the robotic system 100, a trajectory plan (i.e., a parametric trajectory) to complete the task. The accessed trajectory plan may be generated responsive to the task or selected from a database storing a plurality of pre-generated trajectory plans. In particular embodiments, the robotic system 100 may incorporate presets or user preferences when initializing the trajectory plan. The robotic system 100 may use information associated with an environment associated with the robotic system 100 to adapt the parametric trajectory to the current state. Using an ML agent, the robotic system 100 may then determine, based on information associated with an environment associated with the robotic system 100, one or more actions to constrain the trajectory plan. In particular embodiments, one or more pose-based waypoints and one or more joint positions of the robotic system 100 would be constrained by the one or more actions, representing tunable parameters for trajectory plan. In particular embodiments, a joint position may indicate the value/position of a joint of a robot arm. The robotic system 100 may then determine, based on the one or more pose-based waypoints and potentially one or more actions, one or more joint-based waypoints for the trajectory plan. In particular embodiments, a joint-based waypoint may be a waypoint in which the pose of the entire robotic arm would be defined by the joint positions of all of its joints. In particular embodiments, the robotic system 100 may further execute the task based on the one or more joint-based waypoints for the trajectory plan.

By starting with an under-constrained system, the robotic system 100 may leverage machine-learning models to choose optimal parameters and generate efficient final trajectories. In particular embodiments, an under-constrained system may mean the task may not have a closed-form solution and requires a numerical approach or that it may be an ill-posed problem. In particular embodiments, the robotic system 100 may be under-constrained in many ways including but not limited to the following ways. First, the robotic system 100 may be under-constrained based on an under-specified trajectory. In particular embodiments, fully specified trajectories with waypoints defined as pose (position and orientation) may be too rigid and may not adapt to different scenarios. Correspondingly, the robotic system 100 may under-constrain the trajectory itself (e.g. by not specifying the orientation or locking a specific axis of rotation for each waypoint). Starting with a task-based under-constrained parametric trajectory and taking the output of the machine-learning model to optimize and fully constrain the trajectory to a sequence of pose-based waypoints (e.g., position and orientation) may be an effective solution for addressing the technical challenge of reliability of using machine learning for robot motion planning as they may prevent the failure or unexpected motions caused by the machine-learning model defining the entire trajectory. Although this disclosure describes particular under-constrained trajectories in a particular manner, this disclosure contemplates any suitable under-constrained trajectory in any suitable manner.

Figure 2:
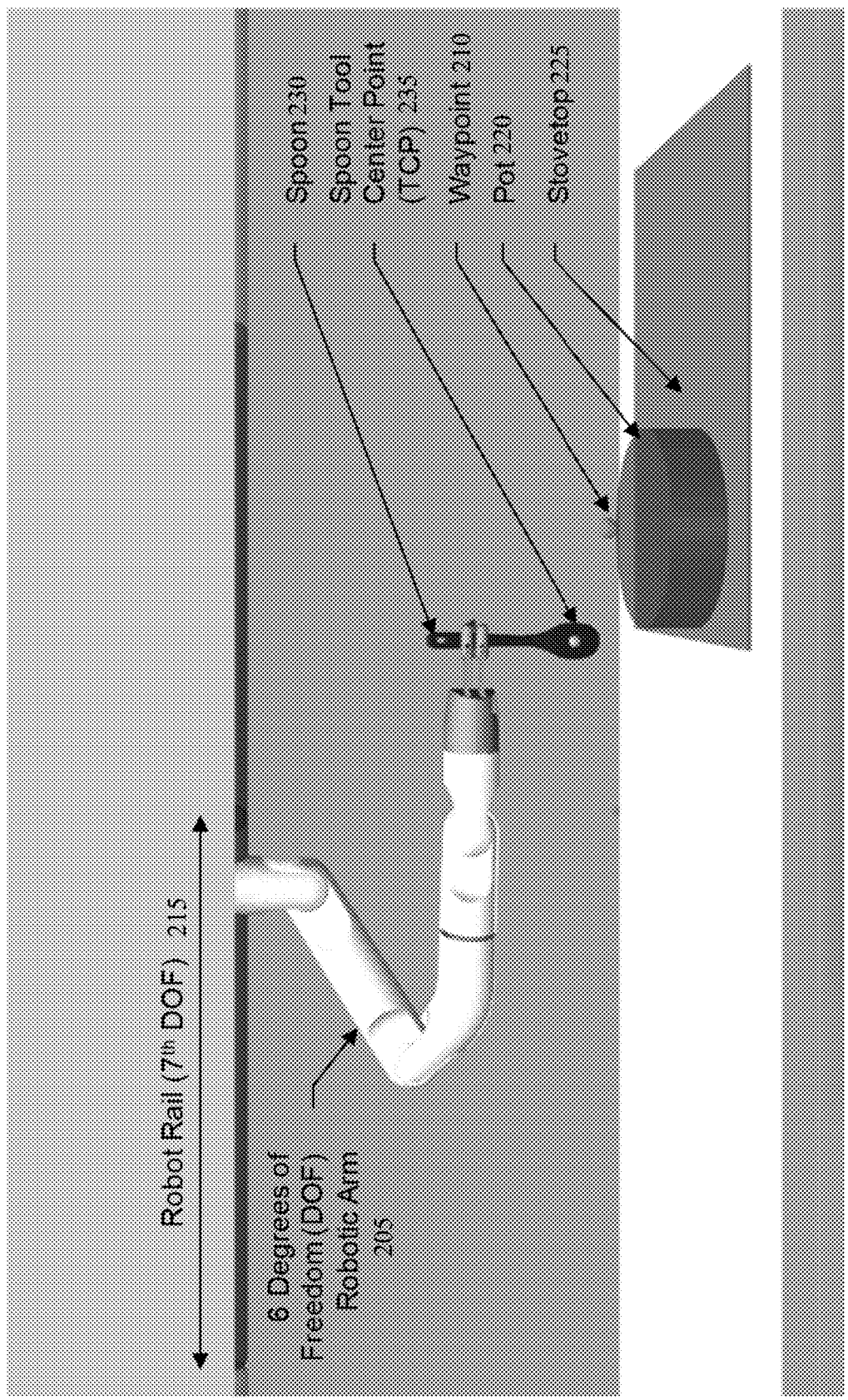
FIG. 2 illustrates an example architecture of the hybrid robotic motion planning system.

Second, the robotic system 100 may be under-constrained by utilizing a robot with higher degree of freedom (DOF). FIG. 2 illustrates an example environment for stirring task in a kitchen. As an example and not by way of limitation, a 6-DOF robot arm 205 may have a limited number of potential IK solutions for a given waypoint position 210 or pose, and it may be possible to find a closed-form solution analytically. However, adding a seventh axis 215, such as a continuous rail, may cause the system to become less-constrained, where there may be approaching infinite solutions for a given waypoint 210. In this case, numerical approaches may be required which are slower than analytical approaches and may not come up with the same solution every time. Instead of using a numerical solver, this scenario may allow for a machine-learning model to choose optimal actions (e.g., choosing the rail position 215) to re-constrain the problem back down to a closed-form 6-DOF problem.

To address the challenges of existing approaches (too slow, too rigid, unreliable, etc.), the robotic system 100 disclosed herein may use a unique hybrid architecture that takes advantage of the strengths of each component while mitigating the weaknesses.

Figure 3:
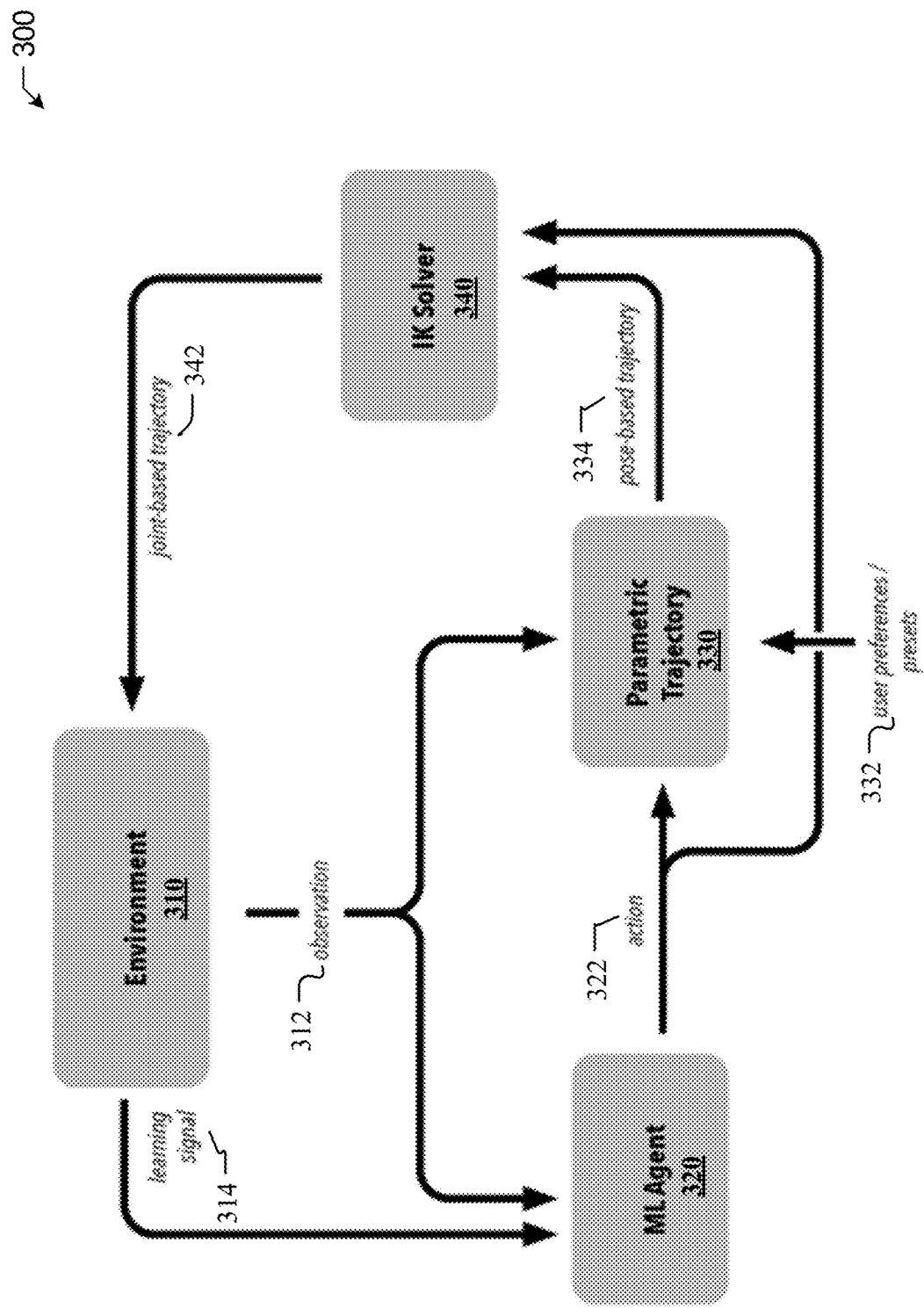
FIG. 3 illustrates an example environment for stirring task in a kitchen.

FIG. 3 illustrates an example architecture 300 of the hybrid robotic motion planning system. In particular embodiments, the robotic system 100 may comprise four primary components, i.e., the environment 310, the machine-learning (ML) agent 320, the parametric trajectory 330, and the inverse kinematic (IK) solver 340. In particular embodiments, the environment 310 may be either a simulation or real-world environment comprising a robot, one or more objects, and the scene. The environment 310 may also comprise other descriptions for the task at hand. In particular embodiments, the robotic system 100 may determine the information associated with the environment 310 associated with the robotic system 100 based on sensor data captured by one or more sensors associated with the robotic system 100. Although this disclosure describes particular architecture in a particular manner, this disclosure contemplates any suitable architecture in any suitable manner.

In particular embodiments, the ML agent 320 may comprise a machine-learning (ML) model trained to take observations 312 about the environment 310 describing the task at hand and learning signals 314 as input and to output actions 322 that may constrain the problem and produce a fully specified trajectory of pose-based waypoints. The actions 322 may go to the parametric trajectory 330 and/or the IK solver 340. The ML agent 320 may be optimized through the learning signal 314 such as a loss or objective function.

The third component may be the parametric trajectory 330 (e.g., for a stirring task) that can adapt to different scenarios based on the observations 312 from the environment 310 (e.g., size of a pot) and actions from the ML agent 320. In particular embodiments, the parametric trajectory 330 may comprise a series of pose-based waypoints in a three-dimensional (3D) space in the environment 310. As an example and not by way of limitation, a pose may be based on one or more of a position or an orientation. The robotic system 100 may incorporate user preferences or presets 332 when initializing the parametric trajectory 330. The user preferences 332 may stay constant throughout all scenarios. As an example and not by way of limitation, user preferences may comprise the resolution of a stirring path. After taking user preferences, the resulting trajectory may be still under-constrained. To create a fully constrained and optimized trajectory, the robotic system 100 may take input from the ML agent 320 and observations 312 about the environment 310 and apply it to the resulting trajectory. As described above, the robotic system 100 may determine one or more trajectory parameters through user preferences, actions from the ML agent 320, and/or observations 312 about the environment 310. Although this disclosure describes particular trajectories in a particular manner, this disclosure contemplates any suitable trajectory in any suitable manner.

In particular embodiments, determining the one or more joint-based waypoints for the trajectory plan may be further based on an inverse kinematic (IK) solver 340. As illustrated in FIG. 3, the fourth component may be the IK solver 340. The IK solver 340 may take the pose-based waypoints (i.e., pose-based trajectory 334) and solve for the joint positions in the trajectory (i.e., outputting a joint-based trajectory 342). In addition, the IK solver 340 may potentially take an action 322 from the ML agent 320 such as rail joint position. As can be seen from the second component through the fourth component, determining the one or more joint-based waypoints may comprise the following steps. The robotic system 100 may first determine, based on the one or more actions 322, observations 312 from the environment 310, and user preferences, the one or more pose-based waypoints for the trajectory plan. The robotic system 100 may then determine, based on the one or more pose-based waypoints and potentially one or more actions, the one or more joint-based waypoints for the trajectory plan. Although this disclosure describes particular solvers in a particular manner, this disclosure contemplates any suitable solver in any suitable manner.

The process for motion planning for the under-constrained robotic system 100 may be illustrated based on the example environment for stirring task in a kitchen. For the stirring task, the environment 310 may be a three-dimensional (3D) simulation environment with a 6-DOF robotic arm 205 on a rail making it 7-DOF 215. The task is to stir the pot 220 on the stovetop 225. The robot is given a series of waypoints generated by a parametric trajectory 330 and it may need to choose the rail position and z-rotation offset to optimize the task. There may be multiple pot sizes and positions that the pot 220 can be on the stovetop 225. The robot may be holding a spoon 230 with its tool center point 235. In particular embodiments, the environment 310 may receive a joint-based trajectory from the IK solver 340. The robotic system 100 may then use a robot joint controller or something similar to move through each waypoint.

The output of the environment 310 may comprise the observation 312. In particular embodiments, the observation 312 may be information about the current state of the environment 310 that the ML agent 320 should consider in order to choose its next action 322. For a stirring task, the observation 312 may comprise pot position, pot diameter, pot contents, spoon dimensions, pot dimension, pot location, etc. For both the simulation and real-world environment 310, the observation 312 may be gathered from a variety of sensors. These sensors may include but not limited to RGB-D cameras, thermal cameras, encoders, etc. The sensor may also include pre-processing by computer vision or machine-learning systems. The observation 312 that the ML agent 320 and the parametric trajectory 330 receive may be the same or may have some differences. The robotic system 100 may be able to adapt the stirring trajectory to different kitchen configurations or pot variations as the under-constrained trajectory may be optimized by the ML agent 320 based on the specific environment 310. Although this disclosure describes particular observations in a particular manner, this disclosure contemplates any suitable observation in any suitable manner.

In particular embodiments, the ML agent 320 may be any neural network, tabular, or similar representation that is trained by machine-learning approaches such as supervised learning (e.g. classification or regression), unsupervised learning, reinforcement learning, or imitation learning. The trained ML agent 320 may take the observation 312 and, in the case of an RL agent, a reward as input, and output one or more actions 322. Depending on the ML agent 320, the learning signal 314 may be a loss function or a reward function that measures how well the agent is performing. In particular embodiments, the environment 310 may track the loss/reward function for each individual waypoint or cumulatively for the entire trajectory. The learning signal 314 may be used to optimize the ML agent 320. Although this disclosure describes particular learning signals in a particular manner, this disclosure contemplates any suitable learning signal in any suitable manner.

In particular embodiments, the second component may be an ML agent 320 that uses loss as its learning signal. The loss function may compare the predictions with the ground-truth labels or values. As an example and not by way of limitation, among many others, some loss functions may include mean squared error (MSE), mean absolute error, cross entropy, hinge loss, etc. Depending upon the action space, the ML agent 320 may be treated as a classification or regression (or multi-output regression) model or similar. In particular embodiments, the robotic system 100 may use a slower optimization method to generate the ground-truth labels for each example scenario and use the ML agent 320 to learn the relationships between the input observation 312 and the optimal action 322. This may result in choosing the optimal action 322 much faster than the standard calculations and optimization techniques. Although this disclosure describes particular machine-learning agents in a particular manner, this disclosure contemplates any suitable machine-learning agent in any suitable manner.

In an alternative embodiment, the second component may be a reinforcement learning (RL) agent. The RL agent may comprise a RL model that receives a reward as its learning signal. A standard RL loop may involve an agent and its environment in discrete time. Every timestep, the agent (e.g., robot) may take an action within the environment (e.g., moving the end-effector) and receive an observation from the environment (e.g., current pose of the robot or objects in the scene) and a reward. The hybrid RL/IK loop with a parametric trajectory 330 may process one waypoint for each loop rather than at each timestep, or it may process an entire trajectory for each loop. As an example and not by way of limitation, the RL model may be any representation including tabular, neural network, etc. The RL model may be trained by any RL approaches such as value-based, actor-critic, or policy optimization, which include algorithms such as vanilla policy gradient, deep Q-Networks, deep deterministic policy gradient, proximal policy optimization, soft actor critic, etc. Although this disclosure describes particular reinforcement learning agent in a particular manner, this disclosure contemplates any suitable reinforcement learning agent in any suitable manner.

In particular embodiments, a trained RL model may take the observation 312 and reward as input and output an action 322 to the parametric trajectory 330 and/or the IK solver 340. Positive or negative reward that the environment 310 gives to the RL agent may serve as signals as to whether the RL agent chose a good or bad action. Taking the stirring task as an example, the reward function for the RL model may be tuned not only to complete the task but may also produce smoother movement. For example, it may include a +5 reward for reaching each waypoint but that may be deducted by either the average distance between each joint's previous and current cartesian position to minimize overall motion or a weighted penalty for over-rotating joint 4 or 6. The reward may be used in the objective function by the RL model for optimization. Although this disclosure describes particular functions in a particular manner, this disclosure contemplates any suitable function in any suitable manner.

In yet another alternative embodiment, the second component may be an imitation learning (IL) agent comprising an IL model. The IL model may use loss as the learning signal 314. In particular embodiments, the IL model may be trained through imitation learning or behavioral cloning with expert demonstrations. In imitation learning, the loss function may be KL-divergence between the expert and learned policies, the total sum of squared error for each episode between the expert and learned policies, or many other IL loss functions. As can be seen, with different agents, determining the one or more actions 322 may be based on one or more of a machine-learning model, a reinforcement learning model, or an imitation learning model. Although this disclosure describes particular imitation learning agent in a particular manner, this disclosure contemplates any suitable imitation learning agent in any suitable manner.

Figure 4:
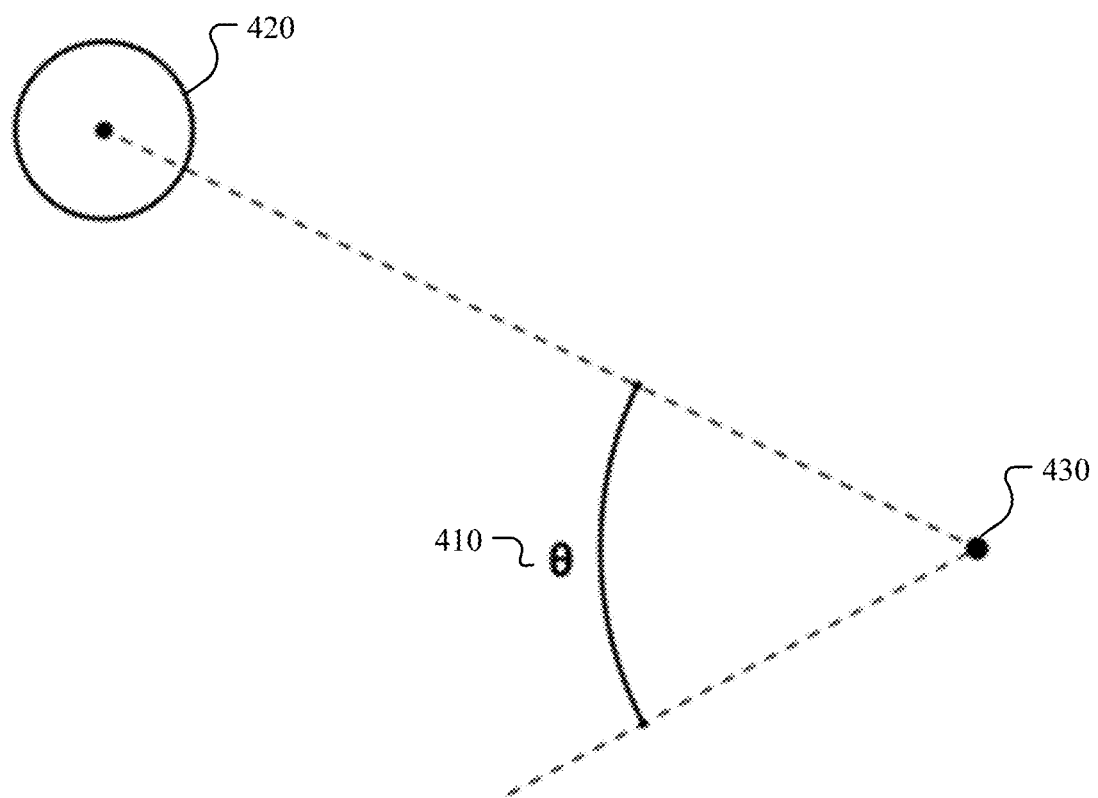
FIG. 4 illustrates an example z-rotation offset.

In particular embodiments, the ML agent 320 may output one or more actions 322. Each of the one or more actions 322 may be based on one or more of a joint position, a rotation offset, or any suitable constraint or parameter associated with the robotic system 100. The action 322 (e.g., rail joint position or z-rotation offset) may move the robotic system 100 from under-constrained to fully specified. The action 322 may either constrain the parametric trajectory 330 (e.g., z-rotation offset) or the IK solver 340 (e.g., rail joint position). FIG. 4 illustrates an example z-rotation offset. FIG. 4 may be interpreted as a top view diagram looking down at the robot base center point 420 and waypoint 430 projected onto a plane. As illustrated in FIG. 4, there is one dashed line connecting the robot base 420 and the waypoint 430 and another dashed line rotated around the waypoint 430 with the angle represented by θ denoting the z-rotation offset 410. In particular embodiments, z-rotation offset may be used with a parametric trajectory where the gripper may initially be in-line with projected vector between the robot base and each waypoint. From this initial orientation, the pose may be further adjusted around the z-axis by theta, θ. This may provide smoother movement and help avoid singularities. Although this disclosure describes particular actions in a particular manner, this disclosure contemplates any suitable action in any suitable manner.

In particular embodiments, the parametric trajectory 330 (i.e., trajectory plan) may be a predefined trajectory for a specific task with certain parameters to be determined by user preference, observations 312 from the environment 310 and/or actions 322 from the ML agent 320. The parametric trajectory 330 may start under-specified so that it can adapt to unique settings such as different kitchen setups, robots, pot positions, etc. The parametric trajectory 330 may take user preferences or presets 332 as input during the initialization. Then, for each new episode, the parametric trajectory 330 may take an action from the ML agent 320 and observation 312 from the environment 310. In particular embodiments, the output of the parametric trajectory 330 may be a trajectory of waypoints defined by pose (position and orientation), referred as pose-based trajectory. The pose-based trajectory may be sent to the IK solver 340. Combining machine learning and a parametric trajectory 330 may be an effective solution for addressing the technical challenge of efficiency of robot motion planning as the parametric trajectory 330 may provide a baseline trajectory that only needs a few extra parameters to customize it to a specific setting. Although this disclosure describes particular parametric trajectories in a particular manner, this disclosure contemplates any suitable parametric trajectory in any suitable manner.

Figure 5:
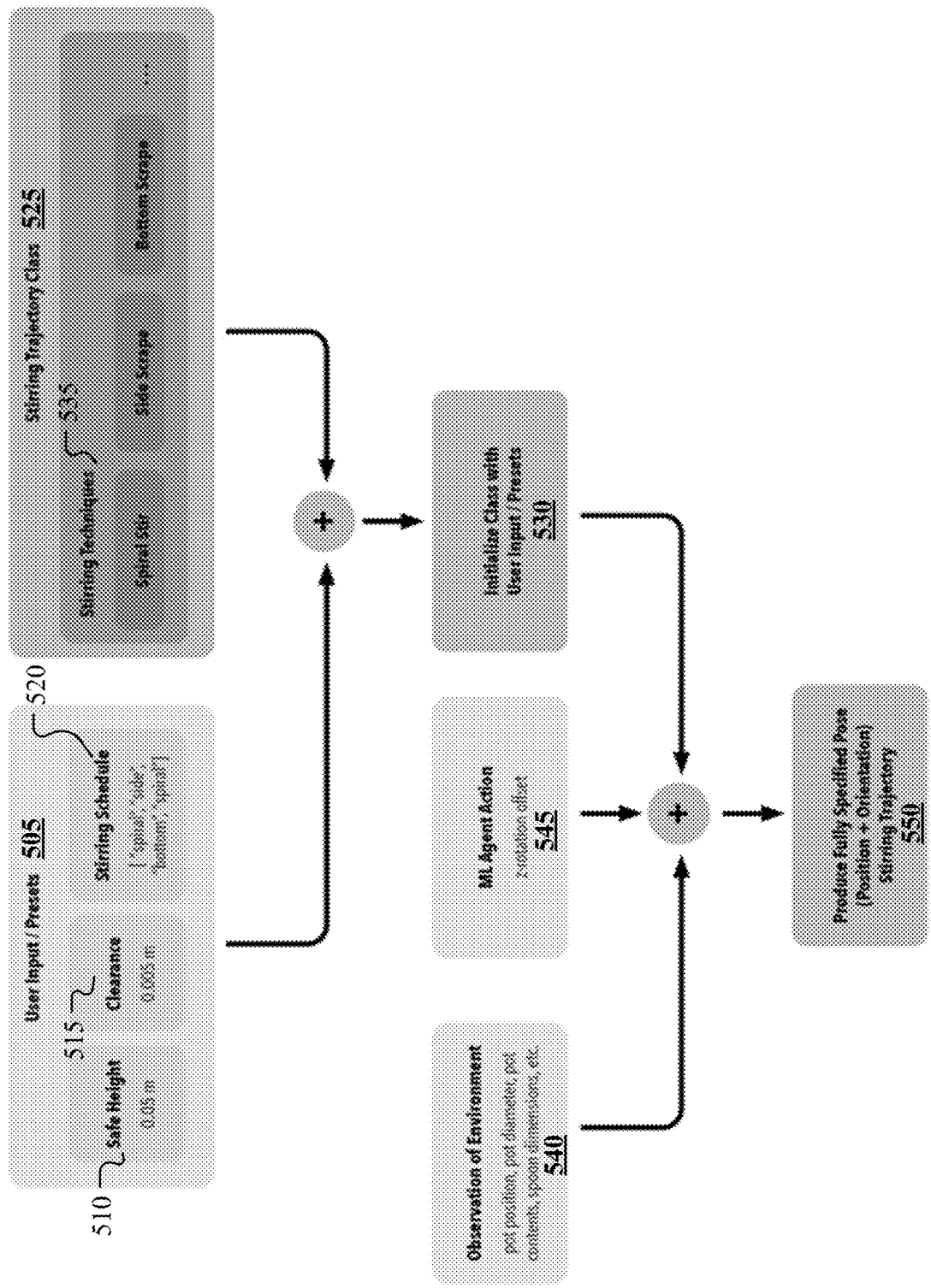
FIG. 5 illustrates an example workflow for generating a fully specified trajectory.
Figure 6:
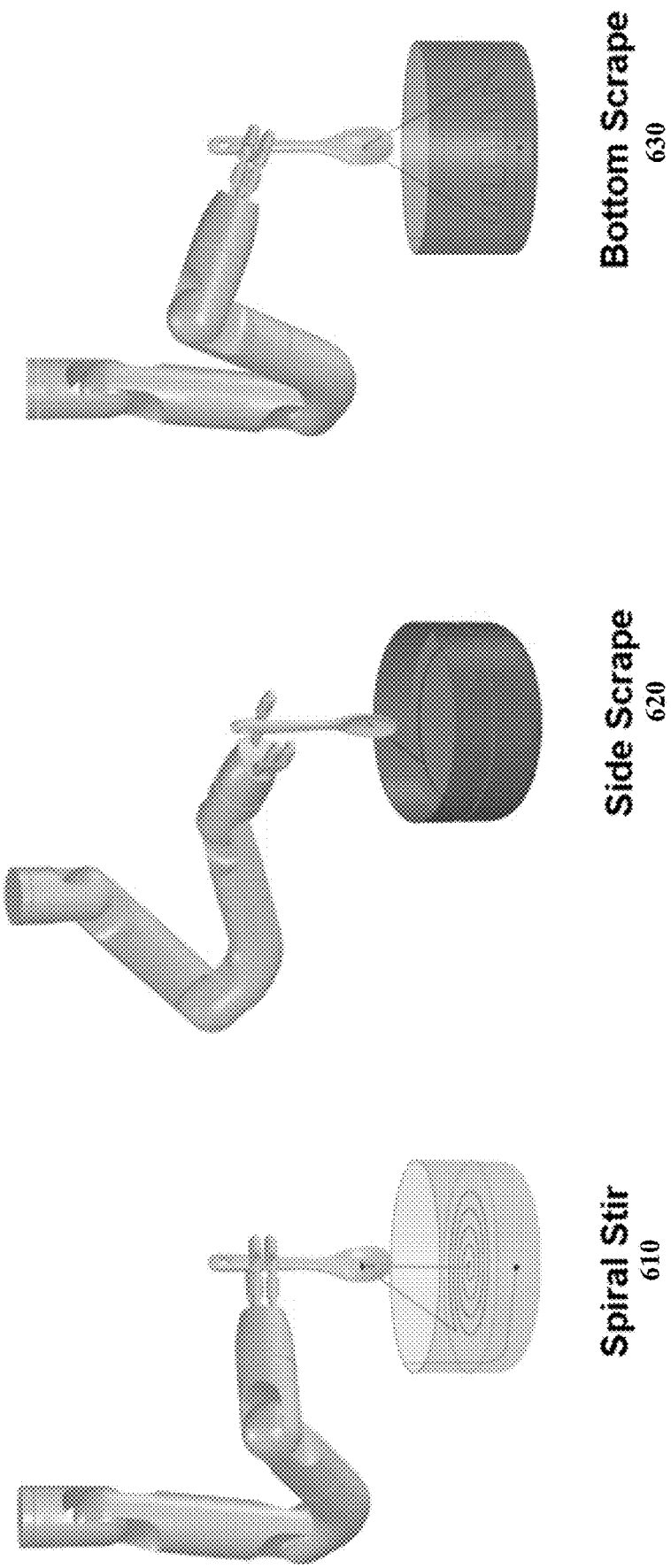
FIG. 6 illustrates example stirring techniques that may be employed and arranged by the user with a schedule.

FIG. 5 illustrates an example workflow 500 for generating a fully specified trajectory. The robotic system 100 may receive user inputs/presets 505. As an example and not by way of limitation, the user inputs/presets 505 may comprise safe height 510, clearance 515, and stirring schedule 520. Based on the stirring trajectory class 525, the robotic system 100 may initialize class 530 (i.e., an instance of a task) based on user input/presets 505. As an example and not by way of limitation, the instance of the stirring trajectory may have pre-defined stirring techniques 535 that may be employed such as a spiral stir, side scrape, etc. The user may input preferences that may persist through the agent's interaction with different environments until manually changed. This may include a stirring schedule 520, which is used to compose the various techniques available. FIG. 6 illustrates example stirring techniques 535 that may be employed and arranged by the user with a schedule 520. FIG. 6 illustrates some example stirring techniques 535 including spiral stir 610, side scrape 620, and bottom scrape 630.

After initialized with the user input, the instance of the trajectory may be further specified with information from the environment (i.e., observation of environment 540) and actions from the ML agent 545, such as z-rotation offset. As an example and not by way of limitation, such information from the environment may comprise the position and dimensions of the pot, spoon dimensions, contents, etc. The stirring trajectory may be able to adapt to different kitchen configurations or pot variations as the under-constrained trajectory may be optimized by the ML agent based on the specific environment. As a result, the robotic system 100 may have a technical advantage of being flexible and able to adapt to many different settings since the robotic system 100 may use user preferences, observation about the environment, and actions from the ML agent to adapt a parametric trajectory to a variety of new settings. The aforementioned further specification may result in a fully specified trajectory 550 of waypoint poses (e.g., position and orientation). Although this disclosure describes generating particular trajectories in a particular manner, this disclosure contemplates generating any suitable trajectory in any suitable manner.

Inverse kinematic (IK) is a mathematic method of calculating joint positions needed for a kinematic chain (e.g. robot arm) to reach a specified pose (position and orientation). In particular embodiments, the IK solver 340 may be any numerical, analytical, or custom solver. As an example and not by way of limitation, the IK solver 340 may be a KDL-IK, a Fast-IK, etc. The input of the IK solver 340 may comprise the pose-based trajectory, which is a fully specified trajectory of waypoints defined by pose (position and orientation). The IK solver 340 may or may not receive an action from the ML agent 320, depending on the design of the system and the actions of the ML agent 320. Actions 322 sent to the IK solver 340 (e.g., rail joint position) may help constrain the potential search (i.e., solution) space. The output of the IK solver 340 may comprise a joint-based trajectory. In particular embodiments, the IK solver 340 may compute the joint positions for each joint in the kinematic chain. As an example and not by way of limitation, for a 7-DOF robotic arm, the IK solver 340 may output an array of 7 values for each pose-based waypoint received. Although this disclosure describes particular solvers in a particular manner, this disclosure contemplates any suitable solver in any suitable manner.

By combining ML/RL with a task-based parametric trajectory, the robotic system 100 may be able to make the trajectory more robust in dynamic and unseen environments by solving for optimal parameters (i.e., actions) to constrain the trajectory. In particular embodiments, the robotic system 100 may achieve this by training the ML agent 320 in simulation where it encounters thousands of environments with different randomized settings. As an example and not by way of limitation, in the stirring task, each training episode may have a different, randomly sampled starting state which could have the stovetop in different positions with a randomly selected pot on a randomly sampled position on the stove. It may also have a randomly selected spoon or stirring utensil along with different stirring mediums within the pot. All the randomizations in the simulation may help train the ML agent 320 to be able to choose actions/parameters in unseen environments to produce efficient trajectories. Using machine learning by training a machine-learning model in thousands of diverse simulated environments may be an effective solution for addressing the technical challenge of rigidity of robot motion planning as when it is deployed the machine-learning model may be robust enough to make decisions in unseen environments.

In particular embodiments, the robotic system 100 may use custom loss/reward functions for the ML/RL agent to create smoother and more natural-looking trajectories. Continuing with the previous stirring example, with an RL agent, to create more natural-looking trajectories, one may want the robot to minimize overall movement of each joint in cartesian space between waypoints. In addition, one may want to avoid over-rotation of J4/J6 as well as J2 going into the negative positions as much as possible. Building these considerations into the reward function, the robotic system 100 may evaluate each joint-based waypoint and award a positive reward for reaching each waypoint successfully but apply penalties for movement one wants to minimize. As an example and not by way of limitation, if J2 goes into the negative, the robotic system 100 may apply a penalty of that value past zero multiplied by a tunable weight. These penalties may be not hard constraints. Therefore, the robotic system 100 may be still able to use those solutions if they are valid. However, the robotic system 100 may learn over time to choose a more preferred/optimal (based on the custom reward function) solution if one is available. Although this disclosure describes particular reward functions in a particular manner, this disclosure contemplates any suitable reward function in any suitable manner.

By using the parametric trajectory 330 as a baseline, there may be no sudden or surprising movements by the robotic system 100. The users may know what to expect from specific tasks even when the environment changes and the robot needs to adapt. As an example and not by way of limitation, if the robot is making coffee and the coffee machine is moved, the robot may not need to try an entirely different movement. The ML agent 320 may be able to adjust the same parametric trajectory to work with the new setup. The user may know what to expect from the previously completed tasks. Furthermore, the robotic system 100 may have a technical advantage of being reliable as the robotic system 100 may use a parametric trajectory 330 as a baseline to ensure successful completion of tasks and use machine learning to optimize the trajectory.

Figure 7A:
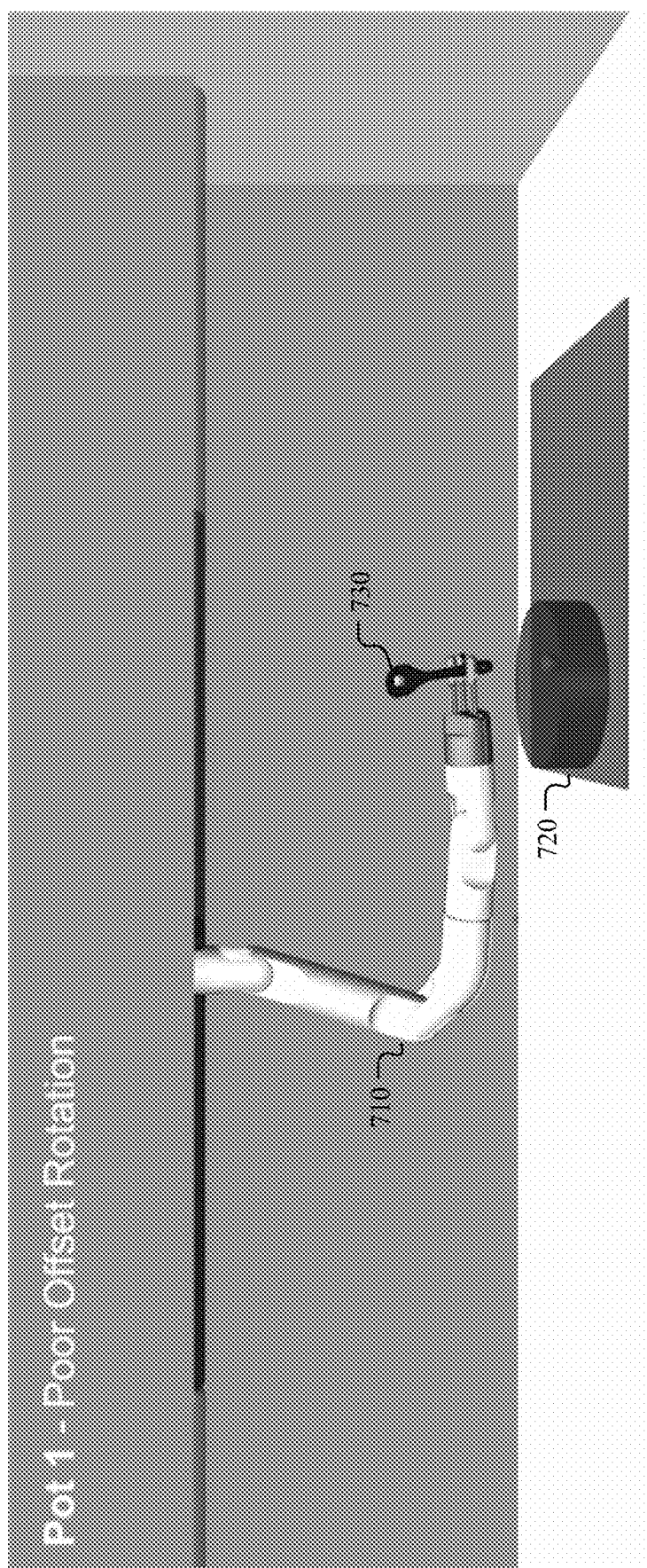
FIG. 7A illustrates an example issue in selecting a wrong z-rotation offset.
Figure 7B:
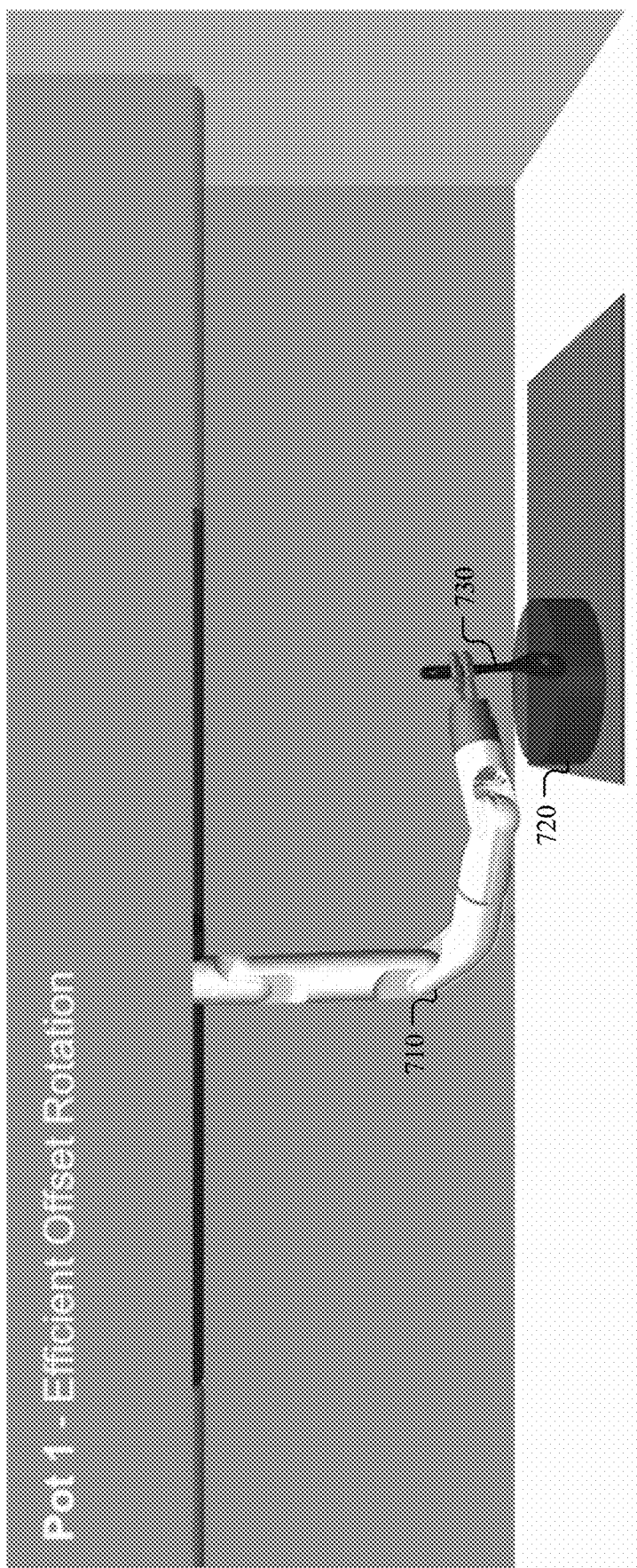
FIG. 7B illustrates an example selection of the best offset for the given situation based on the embodiments disclosed herein.

FIGS. 7A-7B illustrate an example comparison between problematic stirring and reliable stirring. The example of the stirring task may be based on a 6-DOF robot on a rail. In this example, the robot may have a preset position on the rail and the robotic motion planning system may need to choose the z-rotation offset. FIG. 7A illustrates an example issue in selecting a poor z-rotation offset. As indicated in FIG. 7A, the robot arm 710 may need to stir the pot 720 using the spoon 730. With conventional motion planning systems, the robot arm 710 may perform unnatural motion when stirring using the spoon 730, e.g., directing the spoon 730 upwards while flipping back and forth between joint positions. FIG. 7B illustrates an example selection of the best offset for the given situation based on the embodiments disclosed herein. With the hybrid motion planning system as disclosed herein, the robot arm 710 may perform natural motion when stirring the pot 720 using the spoon 730.

Figure 8:
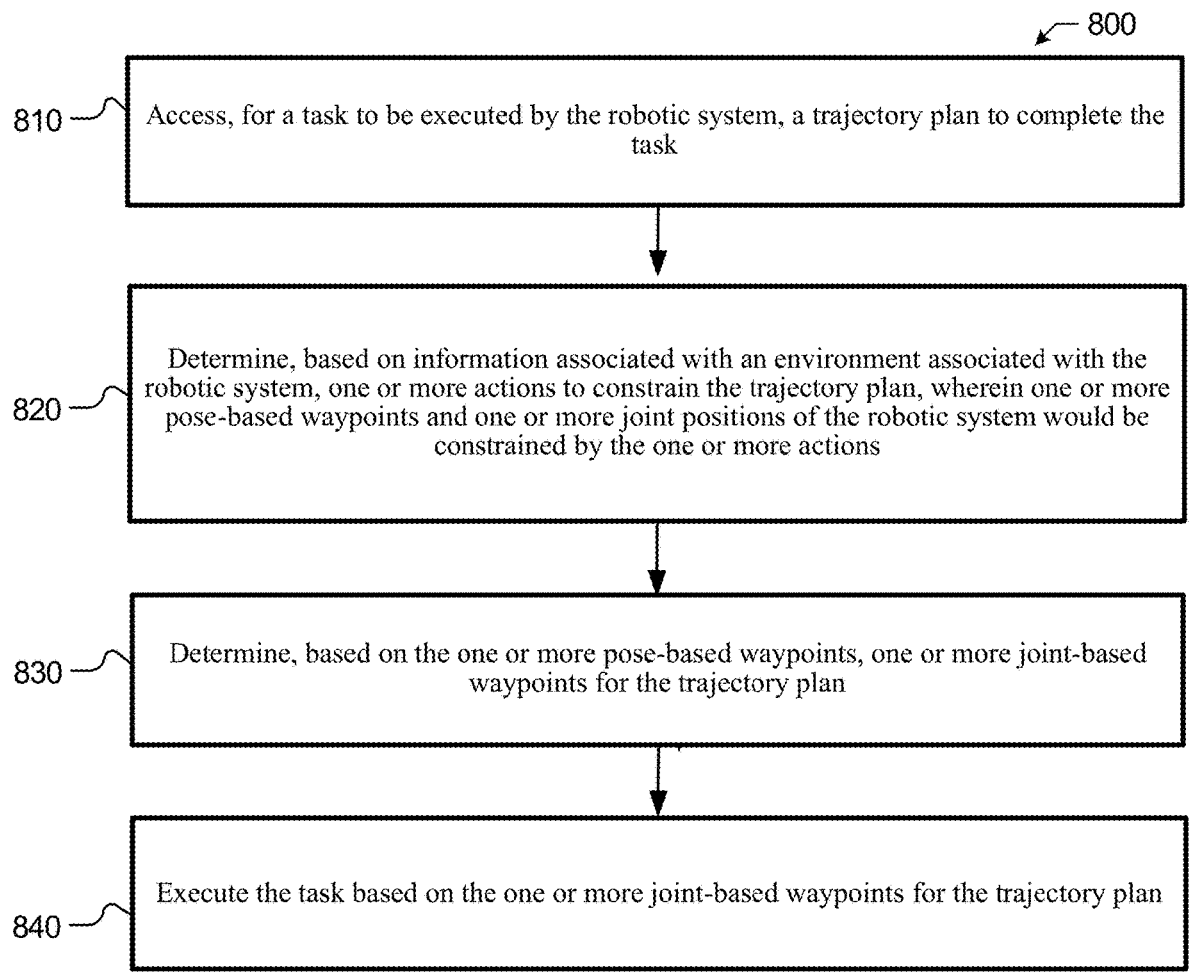
FIG. 8 illustrates a flow diagram of an example method for robotic motion planning.

FIG. 8 illustrates a flow diagram of an example method for robotic motion planning, in accordance with the presently disclosed embodiments. The method 800 may be performed utilizing one or more processing devices (e.g., a robotic system 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 800 may begin at step 810 with the one or more processing devices (e.g., the robotic system 100). For example, in particular embodiments, the robotic system 100 may access, for a task to be executed by the robotic system 100, a trajectory plan to complete the task. The method 800 may then continue at step 820 with the one or more processing devices (e.g., the robotic system 100). For example, in particular embodiments, the robotic system 100 may determine, based on information associated with an environment associated with the robotic system 100, one or more actions to constrain the trajectory plan, wherein one or more pose-based waypoints and one or more joint positions of the robotic system 100 would be constrained by the one or more actions. The method 800 may then continue at step 830 with the one or more processing devices (e.g., the robotic system 100). For example, in particular embodiments, the robotic system 100 may determine, based on the one or more pose-based waypoints, one or more joint-based waypoints for the trajectory plan. The method 800 may then continue at step 840 with the one or more processing devices (e.g., the robotic system 100). For example, in particular embodiments, the robotic system 100 may execute the task based on the one or more joint-based waypoints for the trajectory plan. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for robotic motion planning including the particular steps of the method of FIG. 8, this disclosure contemplates any suitable method for robotic motion planning including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
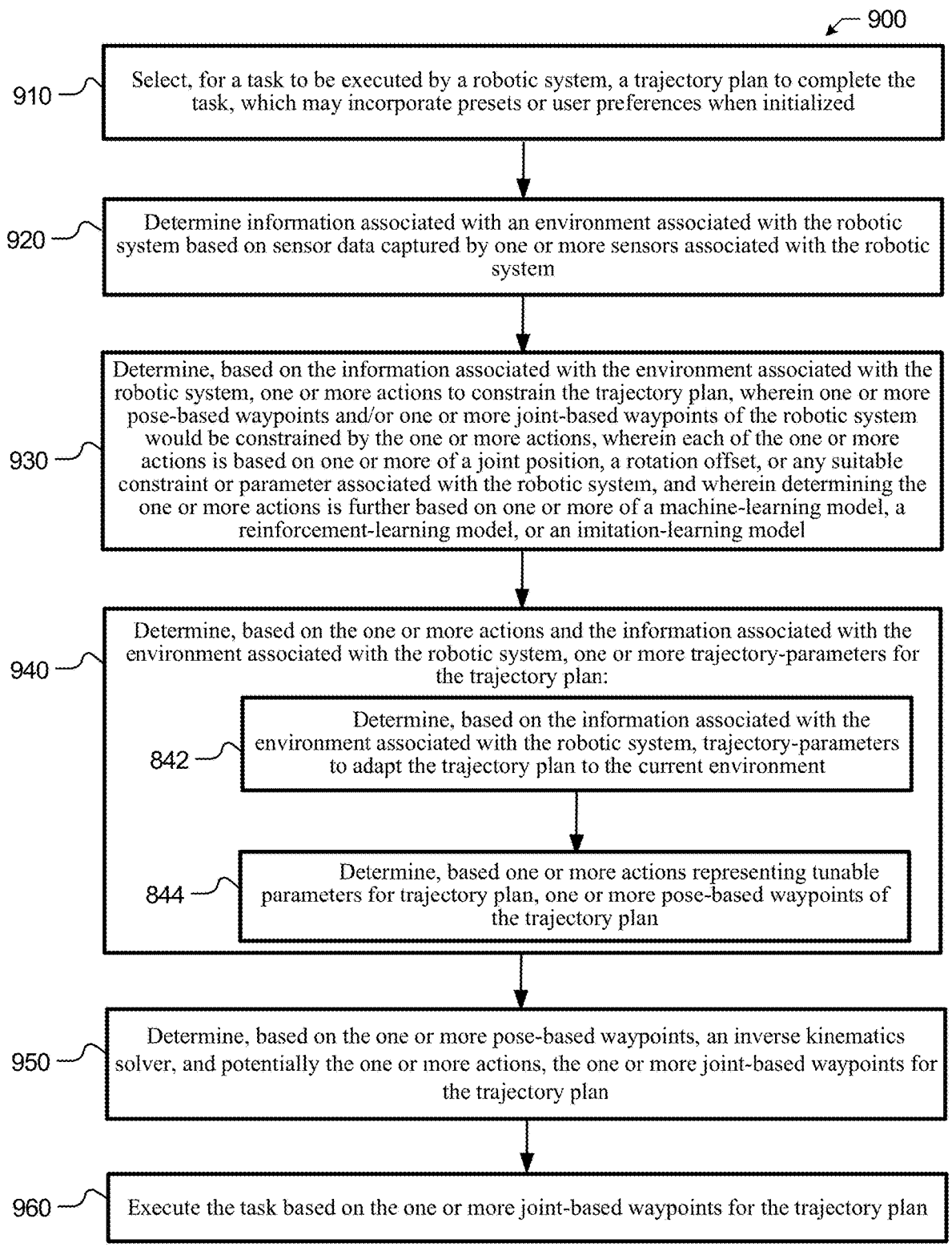
FIG. 9 illustrates a flow diagram of another example method for robotic motion planning.

FIG. 9 illustrates a flow diagram of another example method for robotic motion planning, in accordance with the presently disclosed embodiments. The method 800 may be performed utilizing one or more processing devices (e.g., a robotic system 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 900 may begin at step 910 with the one or more processing devices (e.g., the robotic system 100). For example, in particular embodiments, the robotic system 100 may select, for a task to be executed by the robotic system 100, a trajectory plan to complete the task, which may incorporate presets or user preferences when initialized. The method 900 may then continue at step 920 with the one or more processing devices (e.g., the robotic system 100). For example, in particular embodiments, the robotic system 100 may determine information associated with an environment associated with the robotic system 100 based on sensor data captured by one or more sensors associated with the robotic system 100. The method 900 may then continue at step 930 with the one or more processing devices (e.g., the robotic system 100). For example, in particular embodiments, the robotic system 100 may determine, based on the information associated with the environment associated with the robotic system 100, one or more actions to constrain the trajectory plan, wherein one or more pose-based waypoints and/or one or more joint-based waypoints of the robotic system 100 would be constrained by the one or more actions, wherein each of the one or more actions is based on one or more of a joint position, a rotation offset, or any suitable constraint or parameter associated with the robotic system 100, and wherein determining the one or more actions is further based on one or more of a machine-learning model, a reinforcement-learning model, or an imitation-learning model. The method 900 may then continue at block 940 with the one or more processing devices (e.g., the robotic system 100). For example, in particular embodiments, the robotic system 100 may determine, based on the one or more actions and the information associated with the environment associated with the robotic system 100, one or more trajectory-parameters for the trajectory plan. Step 940 may comprise the following sub-steps. At sub-step 942, the robotic system 100 may determine, based on the information associated with the environment associated with the robotic system 100, trajectory-parameters to adapt the trajectory plan to the current environment. At sub-step 944, the robotic system 100 may determine, based one or more actions representing tunable parameters for trajectory plan, one or more pose-based waypoints of the trajectory plan The method 900 may then continue at step 950 with the one or more processing devices (e.g., the robotic system 100). For example, in particular embodiments, the robotic system 100 may determine, based on the one or more pose-based waypoints, an inverse kinematics solver, and potentially the one or more actions, the one or more joint-based waypoints for the trajectory plan. The method 900 may then continue at step 960 with the one or more processing devices (e.g., the robotic system 100). For example, in particular embodiments, the robotic system 100 may execute the task based on the one or more joint-based waypoints for the trajectory plan. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for robotic motion planning including the particular steps of the method of FIG. 9, this disclosure contemplates any suitable method for robotic motion planning including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Systems and Methods

Figure 10:
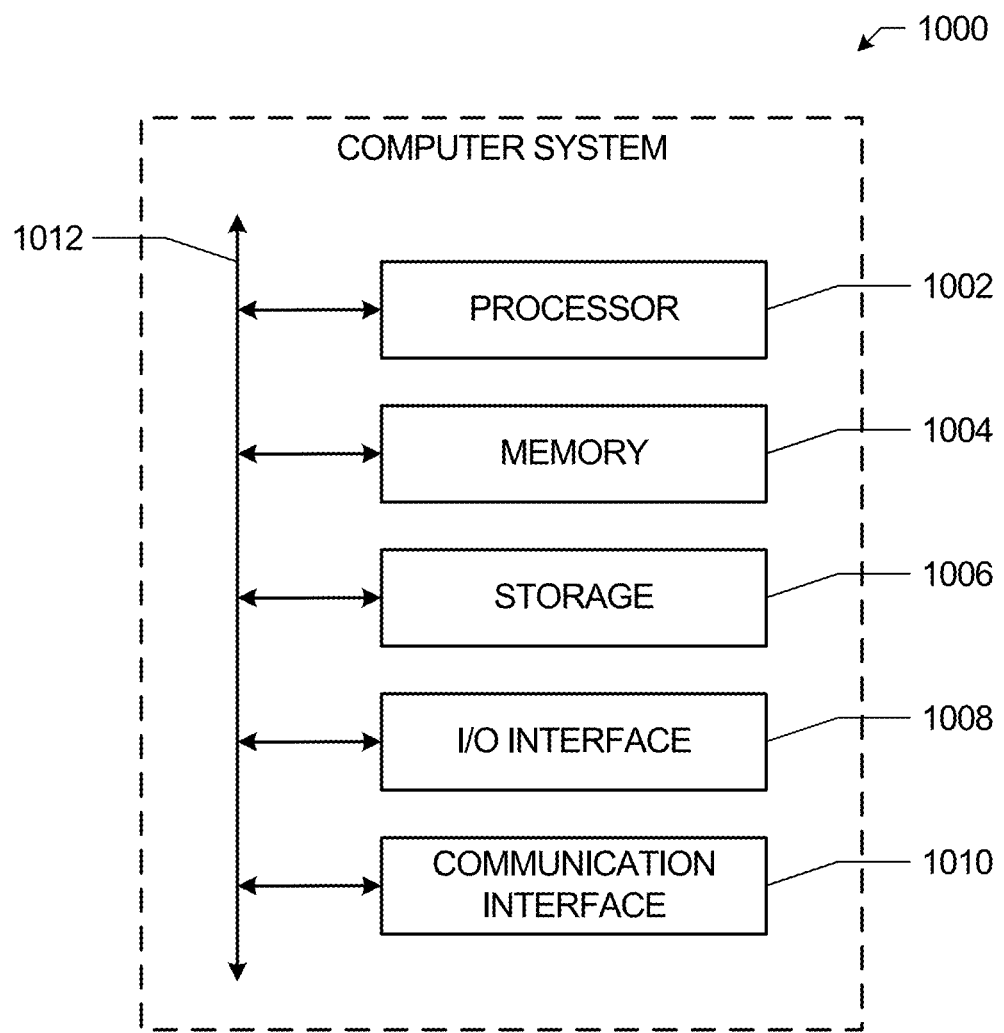
FIG. 10 illustrates an example computer system.

FIG. 10 illustrates an example computer system 1000 that may be utilized to perform robotic motion planning, in accordance with the presently disclosed embodiments. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks.

Where appropriate, one or more computer systems 1000 may perform without substantial spatial or temporal limitation one or more steps of one or more methods described or illustrated herein. As an example, and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement. In particular embodiments, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example, and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002.

Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example, and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere).

One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memory devices 1004, where appropriate. Although this disclosure describes and illustrates particular memory, this disclosure contemplates any suitable memory.

In particular embodiments, storage 1006 includes mass storage for data or instructions. As an example, and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1006 for them. Where appropriate, I/O interface 1008 may include one or more device or software drivers enabling processor 1002 to drive one or more of these I/O devices. I/O interface 1008 may include one or more I/O interfaces 1006, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example, and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example, and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

AI Architecture

Figure 11:
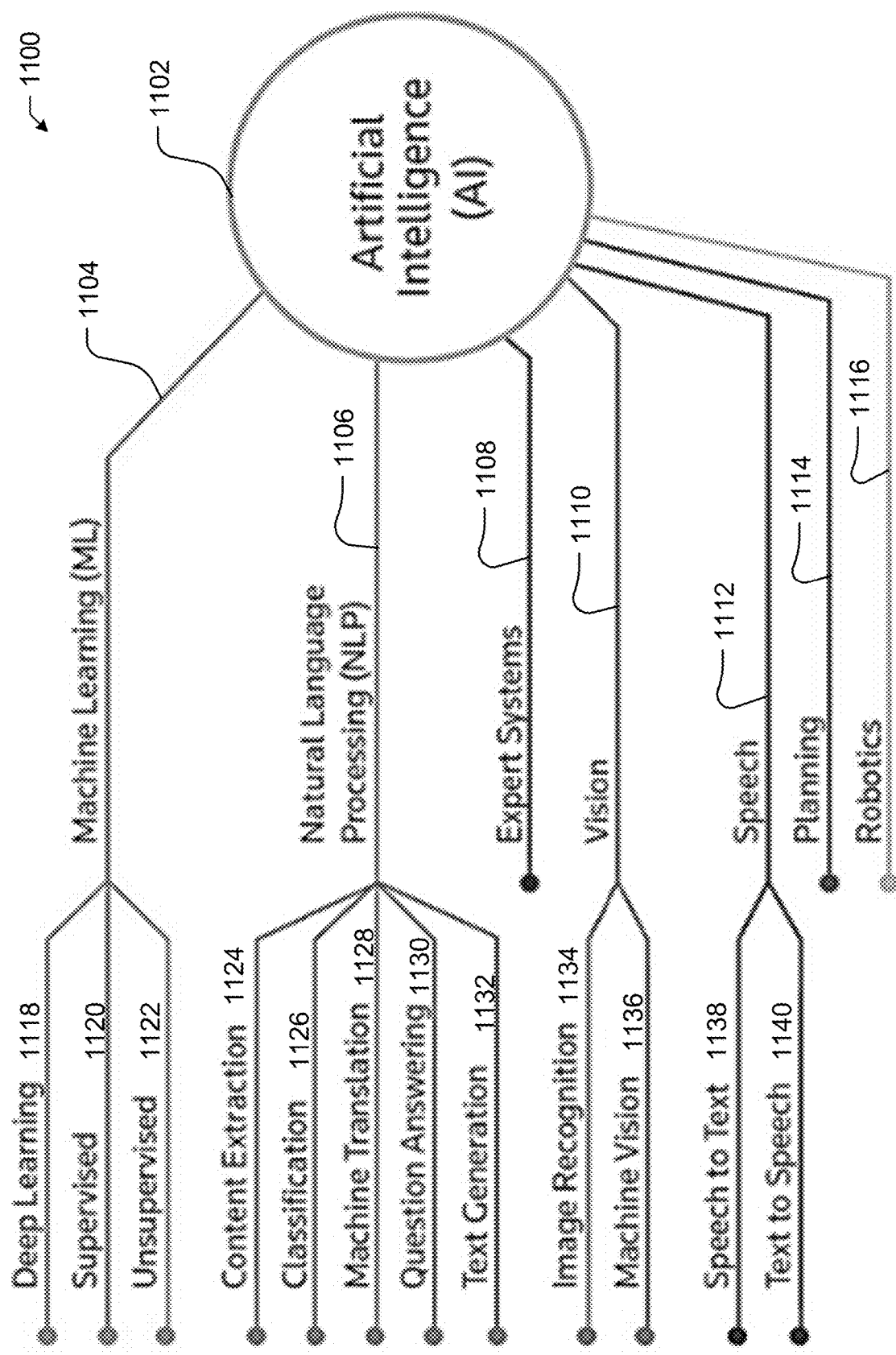
FIG. 11 illustrates a diagram of an example artificial intelligence (AI) architecture.

FIG. 11 illustrates a diagram 1100 of an example artificial intelligence (AI) architecture 1102 that may be utilized to perform robotic motion planning, in accordance with the presently disclosed embodiments. In particular embodiments, the AI architecture 1102 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 11, the AI architecture 1102 may include machine leaning (ML) algorithms and functions 1104, natural language processing (NLP) algorithms and functions 1106, expert systems 1108, computer-based vision algorithms and functions 1110, speech recognition algorithms and functions 1112, planning algorithms and functions 1114, and robotics algorithms and functions 1116. In particular embodiments, the ML algorithms and functions 1104 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 1104 may include deep learning algorithms 1118, supervised learning algorithms 1120, and unsupervised learning algorithms 1122.

In particular embodiments, the deep learning algorithms 1118 may include any artificial neural networks (ANNs) that may be utilized to learn deep levels of representations and abstractions from large amounts of data. For example, the deep learning algorithms 1118 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 1120 may include any algorithms that may be utilized to apply, for example, what has been learned in the past to new data using labeled examples for predicting future events. For example, starting from the analysis of a known training dataset, the supervised learning algorithms 1120 may produce an inferred function to make predictions about the output values. The supervised learning algorithms 1120 can also compare its output with the correct and intended output and find errors in order to modify the supervised learning algorithms 1120 accordingly. On the other hand, the unsupervised learning algorithms 1122 may include any algorithms that may applied, for example, when the data used to train the unsupervised learning algorithms 1122 are neither classified or labeled. For example, the unsupervised learning algorithms 1122 may study and analyze how systems may infer a function to describe a hidden structure from unlabeled data.

In particular embodiments, the NLP algorithms and functions 1106 may include any algorithms or functions that may be suitable for automatically manipulating natural language, such as speech and/or text. For example, in particular embodiments, the NLP algorithms and functions 1106 may include content extraction algorithms or functions 1124, classification algorithms or functions 1126, machine translation algorithms or functions 1128, question answering (QA) algorithms or functions 1130, and text generation algorithms or functions 1132. In particular embodiments, the content extraction algorithms or functions 1124 may include a means for extracting text or images from electronic documents (e.g., webpages, text editor documents, and so forth) to be utilized, for example, in other applications.

In particular embodiments, the classification algorithms or functions 1126 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 1128 may include any algorithms or functions that may be suitable for automatically converting source text in one language, for example, into text in another language. The QA algorithms or functions 1130 may include any algorithms or functions that may be suitable for automatically answering questions posed by humans in, for example, a natural language, such as that performed by voice-controlled personal assistant devices. The text generation algorithms or functions 1132 may include any algorithms or functions that may be suitable for automatically generating natural language texts.

In particular embodiments, the expert systems 1108 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 1110 may include any algorithms or functions that may be suitable for automatically extracting information from images (e.g., photo images, video images). For example, the computer-based vision algorithms and functions 1110 may include image recognition algorithms 1134 and machine vision algorithms 1136. The image recognition algorithms 1134 may include any algorithms that may be suitable for automatically identifying and/or classifying objects, places, people, and so forth that may be included in, for example, one or more image frames or other displayed data. The machine vision algorithms 1136 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 1112 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 1138 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 1140 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a robotic system:
   accessing, for a task to be executed by the robotic system, a trajectory plan to complete the task, wherein the trajectory plan constrains one or more first degrees of freedom of the robotic system and underconstrains one or more second degrees of freedom of the robotic system;
   determining, using a trained machine-learning model for the robotic system and based on information associated with an environment associated with the robotic system, one or more actions that constrain the underconstrained second degrees of freedom of the robotic system without adjusting the constrained one or more first degrees of freedom of the trajectory plan;
   determining, based on information associated with the environment, an adjustment to the trajectory plan for at least one of the one or more first degrees of freedom without adjusting the determined one or more actions, wherein one or more pose-based waypoints and one or more joint positions of the robotic system are defined by the adjusted trajectory plan and the one or more actions;

determining, based on the one or more pose-based waypoints, one or more joint-based waypoints for the trajectory plan; and executing the task based on the one or more joint-based waypoints for the trajectory plan.

2. The method of claim 1, further comprising:
determining, based on the one or more actions, the one or more pose-based waypoints for the trajectory plan.

3. The method of claim 1, wherein determining the one or more joint-based waypoints for the trajectory plan is further based on the one or more actions.

4. The method of claim 1, wherein determining the one or more joint-based waypoints for the trajectory plan is further based on an inverse kinematic solver.

5. The method of claim 1, further comprising initializing the trajectory plan based on one or more of:
a preset, or
a user preference.

6. The method of claim 1, further comprising:
determining the information associated with the environment associated with the robotic system based on sensor data captured by one or more sensors associated with the robotic system.

7. The method of claim 1, wherein the trained machine-learning model is at least one of a reinforcement-learning model or an imitation-learning model.

8. A robotic system comprising:
a computing system with control software;
a robot controller;
one or more robotic limbs;
one or more non-transitory computer-readable storage media including instructions; and
one or more processors coupled to the storage media, the one or more processors configured to execute the instructions to:
access, for a task to be executed by the robotic system, a trajectory plan to complete the task, wherein the trajectory plan constrains one or more first degrees of freedom of the robotic system and underconstrains one or more second degrees of freedom of the robotic system;
determine, using a trained machine-learning model for the robotic system and based on information associated with an environment associated with the robotic system, one or more actions that constrain the underconstrained second degrees of freedom of the robotic system without adjusting the constrained one or more first degrees of freedom of the trajectory plan;
determining, based on information associated with the environment, an adjustment to the trajectory plan for at least one of the one or more first degrees of freedom without adjusting the determined one or more actions, wherein one or more pose-based waypoints and one or more joint positions of the robotic system would be constrained by are defined by the adjusted trajectory plan and the one or more actions the one or more actions;
determine, based on the one or more pose-based waypoints, one or more joint-based waypoints for the trajectory plan; and
execute the task based on the one or more joint-based waypoints for the trajectory plan.

9. The robotic system of claim 8, wherein the processors are further configured to execute the instructions to:
determine, based on the one or more actions, the one or more pose-based waypoints for the trajectory plan.

10. The robotic system of claim 8, wherein determining the one or more joint-based waypoints for the trajectory plan is further based on the one or more actions.

11. The robotic system of claim 8, wherein determining the one or more joint-based waypoints for the trajectory plan is further based on an inverse kinematic solver.

12. The robotic system of claim 8, wherein the processors are further configured to execute the instructions to initialize the trajectory plan based on one or more of:
a preset, or
a user preference.

13. The robotic system of claim 8, wherein the processors are further configured to execute the instructions to:
determine the information associated with the environment associated with the robotic system based on sensor data captured by one or more sensors associated with the robotic system.

14. The robotic system of claim 8, wherein the trained machine-learning model is at least one of a reinforcement-learning model or an imitation-learning model.

15. A computer-readable non-transitory storage media comprising instructions executable by a processor to:
access, for a task to be executed by the robotic system, a trajectory plan to complete the task, wherein the trajectory plan constrains one or more first degrees of freedom of the robotic system and underconstrains one or more second degrees of freedom of the robotic system;
determine, using a trained machine-learning model for the robotic system and based on information associated with an environment associated with the robotic system, one or more actions that constrain the underconstrained second degrees of freedom of the robotic system without adjusting the constrained one or more first degrees of freedom of the trajectory plan;
determining, based on information associated with the environment, an adjustment to the trajectory plan for at least one of the one or more first degrees of freedom without adjusting the determined one or more actions, wherein one or more pose-based waypoints and one or more joint positions of the robotic system are defined by the adjusted trajectory plan and the one or more actions;
determine, based on the one or more pose-based waypoints, one or more joint-based waypoints for the trajectory plan; and
execute the task based on the one or more joint-based waypoints for the trajectory plan.

16. The media of claim 15, wherein the instructions are further executable by the processor to:
determine, based on the one or more actions, the one or more pose-based waypoints for the trajectory plan.

17. The media of claim 15, wherein determining the one or more joint-based waypoints for the trajectory plan is further based on the one or more actions.

18. The media of claim 15, wherein determining the one or more joint-based waypoints for the trajectory plan is further based on an inverse kinematic solver.

19. The media of claim 15, wherein the instructions are further executable by the processor to initialize the trajectory plan based on one or more of:
a preset, or
a user preference.

20. The media of claim 15, wherein the instructions are further executable by the processor to:

determine the information associated with the environment associated with the robotic system based on sensor data captured by one or more sensors associated with the robotic system.

* * * * *